US012581286B2

(12) United States Patent
Van Oost et al.

(10) Patent No.: US 12,581,286 B2
(45) Date of Patent: Mar. 17, 2026

(54) SYSTEM AND METHOD FOR FORWARD DETECTION OF WIRELESS CAPABILITIES

(71) Applicant: AIRTIES S.A.S., Istanbul (TR)

(72) Inventors: Koen Van Oost, Istanbul (TR); Karel Van Doorselaer, Istanbul (TR); Frederik Verwaest, Istanbul (TR)

(73) Assignee: AIRTIES S.A.S., Paris (FR)

( * ) Notice: Subject to any disclaimer, the term of this patent is extended or adjusted under 35 U.S.C. 154(b) by 420 days.

(21) Appl. No.: 18/019,059

(22) PCT Filed: Aug. 2, 2021

(86) PCT No.: PCT/IB2021/057061
§ 371 (c)(1),
(2) Date: Jan. 31, 2023

(87) PCT Pub. No.: WO2022/024100
PCT Pub. Date: Feb. 3, 2022

(65) Prior Publication Data
US 2023/0284011 A1 Sep. 7, 2023

Related U.S. Application Data

(60) Provisional application No. 63/059,561, filed on Jul. 31, 2020.

(51) Int. Cl.
*H04W 8/24* (2009.01)
*H04W 84/12* (2009.01)

(52) U.S. Cl.
CPC .............. *H04W 8/24* (2013.01); *H04W 84/12* (2013.01)

(58) Field of Classification Search
CPC ....... H04W 8/24; H04W 84/12; H04W 24/00; H04W 88/08
See application file for complete search history.

(56) References Cited

U.S. PATENT DOCUMENTS

| | | |
|---|---|---|
| 2007/0072638 A1 | 3/2007 | Yang et al. |
| 2008/0209031 A1 | 8/2008 | Zhu et al. |

(Continued)

FOREIGN PATENT DOCUMENTS

| | | |
|---|---|---|
| WO | 2005/048567 A2 | 5/2005 |

OTHER PUBLICATIONS

Kannan, Nav., et al., "How to Finally Conquer Wi-Fi in the Home: Service Provider Style," A Technical Paper prepared for SCTE-ISBE, Jan. 1, 2018, (Jan. 1, 2018), pp. 1-46, XP055852419, Retrieved from the Internet: URL: https://www.nctatechnicalpapers.com/Paper/2018/2018-how-to-finally-conquer-wi-fi-in-the-home-service-provider-style/download [retrieved on Oct. 18, 2021].

*Primary Examiner* — Jae Y Lee
*Assistant Examiner* — Nick Anon Sundara
(74) *Attorney, Agent, or Firm* — Volpe Koenig

(57) ABSTRACT

A system and method for forward detection of wireless capabilities of wireless devices is disclosed. Capability related information may include various information, ranging from supported IEEE 802.11 MAC layer or PHY layer features, such as, but not limited to, 802.11 n, 802.11 ac, 802.11 ax capability, supported number of spatial streams, support for Multi-User MIMO (MU-MIMO). Aggregated MAC Service Data Unit (AMSDU) capability. Aggregated MAC Protocol Data Unit (AMPDU) capability. Beamforming capabilities, to supported features of the 802.11 protocol, such as, but not limited to, fast link initialization, fast BSS transition, to Wi-Fi Alliance features such as, but not limited to, Agile Multiband™, WiFi Simple Config™, and Optimized Connection Experience™.

20 Claims, 3 Drawing Sheets

(56) References Cited

U.S. PATENT DOCUMENTS

| | | | |
|---|---|---|---|
| 2014/0179352 A1 | 6/2014 | V.M. et al. | |
| 2018/0234320 A1* | 8/2018 | Paulraj | H04L 47/25 |
| 2018/0310240 A1 | 10/2018 | Kannan | |
| 2020/0112871 A1* | 4/2020 | Merlin | H04W 24/02 |
| 2020/0213933 A1* | 7/2020 | Patil | H04W 80/08 |
| 2021/0243685 A1* | 8/2021 | Tachibana | H04W 48/18 |
| 2021/0314846 A1* | 10/2021 | Chu | H04W 40/244 |

* cited by examiner

301 Processor(s)

302 Transceiver(s)

303 Antenna(s)

304 User Input

305 User Output

306 Storage

SYSTEM AND METHOD FOR FORWARD DETECTION OF WIRELESS CAPABILITIES

CROSS REFERENCE TO RELATED APPLICATION

This application claims the benefit of U.S. Provisional Application No. 63/059,561, filed Jul. 31, 2020, which is incorporated by reference herein.

SUMMARY

A system and method for forward detection of wireless capabilities of wireless devices is disclosed. Capability related information may include various information, ranging from supported IEEE 802.11 MAC layer or PHY layer features, such as, but not limited to, 802.11n, 802.11ac, 802.11ax capability, supported number of spatial streams, support for Multi-User MIMO (MU-MIMO), Aggregated MAC Service Data Unit (AMSDU) capability, Aggregated MAC Protocol Data Unit (AMPDU) capability, Beamforming capabilities, to supported features of the 802.11 protocol, such as, but not limited to, fast link initialization, fast BSS transition, to Wi-Fi Alliance features such as, but not limited to, Agile Multiband™, Wi-Fi Simple Config™, and Optimized Connection Experience™.

BRIEF DESCRIPTION OF THE DRAWINGS

FIG. 3 is a block diagram of wireless device hardware configured to performs the methods disclosed herein.

DETAILED DESCRIPTION

Figure 1:
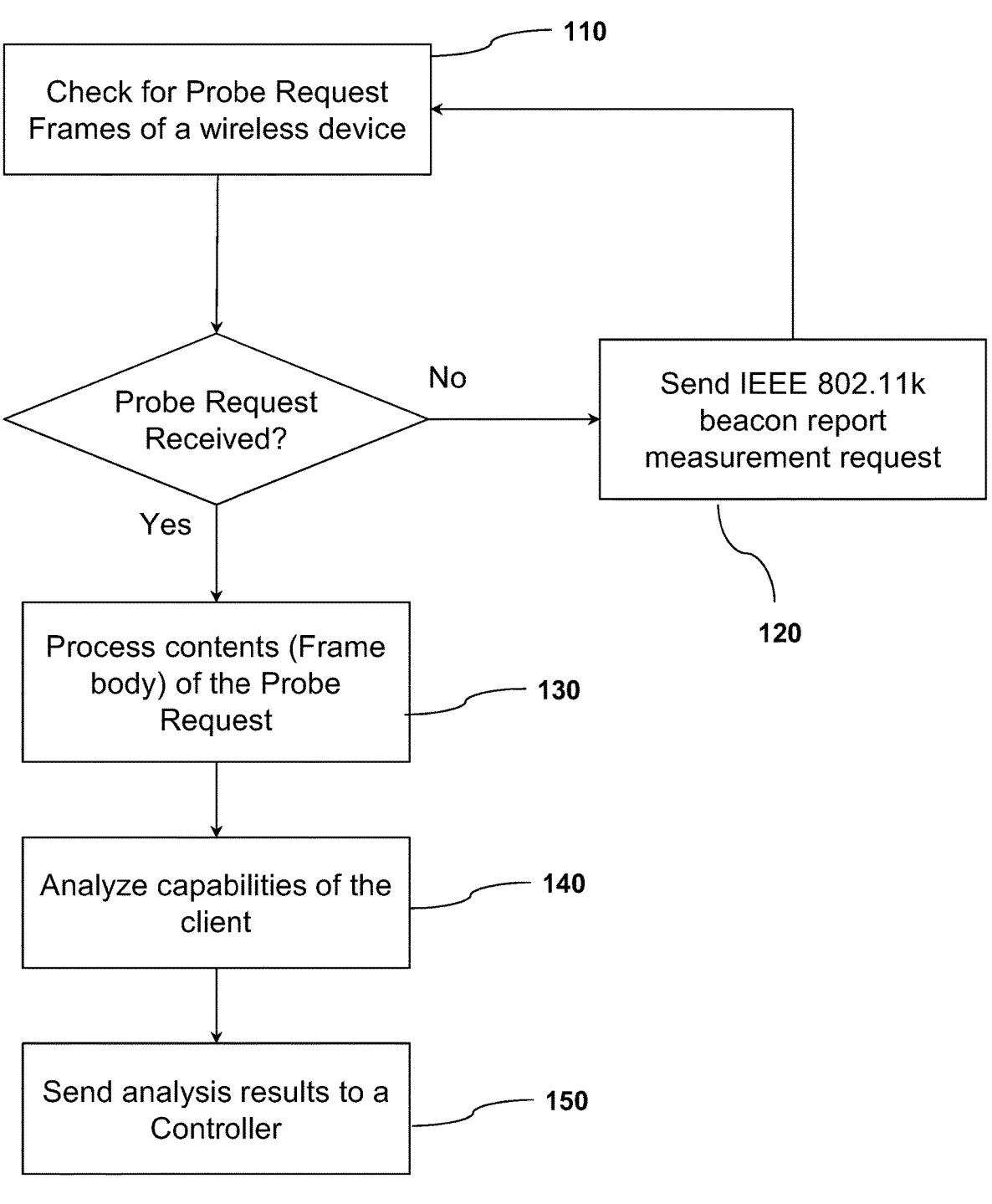
FIG. 1 is a method flow diagram according to one embodiment where a STA reports capabilities to an AP in a Probe Request frame.

Information regarding wireless capabilities of wireless devices in a network can be utilized by Business Intelligence Tools (BITs) for network analysis. An example of the network analysis may be discovering the wireless devices with obsolete technologies and informing the users about possible capacity limitations due to the presence of these devices within the network. The obsolete devices may be wireless network devices such as, but not limited to, Access Points (APs), Gateways, wireless routers, mobile computing devices, mobile phones, smartphones, personal computers (PCs), and laptops, for example.

Devices equipped with state-of-the-art wireless technologies that provide improved wireless capabilities are emerging to meet the high data-rate, low delay, low-jitter requirements of the new and continuously updated applications, such as, but not limited to, on-demand video, online gaming, and video conferencing. Yet, the capabilities utilized by a mobile device are actually limited by the set of compatible features shared between the mobile device and the AP it is connected to. For example, if a mobile device is equipped with a wireless chip that supports the IEEE 802.11ax protocol while the AP it is connected to supports only the IEEE 802.11ac standard, then the mobile device would operate in 802.11ac mode. Note that IEEE 802.11ax is superior to its predecessor 802.11ac in terms of many performance metrics, such as, but not limited to, better utilization of channel bandwidth, higher maximum data-rates, better power management (which leads to more efficient battery management for mobile devices). Hence, the user of the mobile device would not be able to utilize the full capability of the mobile device.

The method disclosed herein includes detection of wireless capabilities of a wireless device by a wireless network device, such as, but not limited to, an Access Point (AP), a Gateway, or a wireless router. The wireless device whose wireless capability is to be detected, may be any device that hosts a wireless (network) interface. For example, the wireless device may be a wireless mobile device, such as but not limited to, a smartphone, a tablet, a laptop, or may be a wireless device, such as but not limited to, a personal computer (PC), a game console, or may be a wireless communication device such as an IEEE 802.11 station (STA), or may be a wireless network device, such as, but not limited to, an AP, a Gateway, a wireless router, a universal repeater, a repeater.

The method further includes delivery of the detected wireless capabilities to a BIT, which may reside in a remote server, or in a cloud-system, or in a network management entity that resides in the local area network (LAN) or that resides in an Edge network. The detected wireless capabilities may be delivered to the BIT, by an AP that detects the wireless capabilities, or by a controller that resides in the network. In one embodiment, the controller may be a Wi-Fi Alliance EasyMesh controller.

The BIT may analyse the detected wireless capabilities of the wireless devices present in the network to give insight about the wireless network. By making use of the detected capability information of the wireless devices in the network, in one embodiment, the BIT may provide insight about capacity utilization in the network. In another embodiment, the BIT may provide insight about QoE (Quality of Experience) related aspects of the network. The BIT may combine the detected wireless capability information with other information, such as, but not limited to, interference level in the network and/or traffic demand in the network to draw conclusions and provide recommendations to improve network performance.

As used herein, the capability detecting wireless network device is referred to as an "Access Point" (AP), and the wireless device whose capability is detected is referred to as a "station" (STA). The terms frame and message are used interchangeably without implying a difference in meaning.

In one embodiment, an AP may have wireless capabilities inferior to that of STAs in the network. For example, an AP that supports the IEEE 802.11ac standard may detect IEEE 802.11 capability of a STA that supports a more recent IEEE 802.11 standard, such as the IEEE 802.11ax standard.

An AP may detect wireless capabilities of STAs that are already connected to it. In other words, the AP may detect wireless capabilities of STAs that are already associated with the AP. In another embodiment, AP may detect wireless capabilities of STAs that are not connected to it. In other words, the AP may detect wireless capabilities of STAs that are not associated with the AP.

It is worthwhile to note that according to the IEEE standard, a wireless device, a STA, (in non-AP mode as defined in IEEE 802.11) provides information regarding its capabilities in a Probe Request frame. This Probe Request frame may be received by an AP or another device, such as another STA, that receives the Probe Request frame. A wireless device also provides information regarding its capabilities in an Association Request frame sent to an AP. Likewise, an AP (in non-STA mode as defined in IEEE 802.11) provides information regarding its capabilities in a beacon frame to a STA, and also in a Probe Response frame (which are sent by the wireless device, AP, in response to a received Probe Request frame). This is all well known to those skilled in the art.

According to the IEEE standards, the capability information provided by a STA in an Association Request frame is a subset of the full capabilities of the STA. According to the standard, a STA announces only the capabilities that match the capabilities of an AP to which the STA is sending the Association Request frame. The capabilities of the AP are learned by the STA via receipt of beacon frames and/or Probe Response frames received from the AP. If a STA has superior capabilities compared to those of the AP it is associating with, the STA would thus only announce capabilities that match that of the AP in the Association Request frame. For example, if an AP supports the IEEE 802.11ac standard, whereas the STA supports the IEEE 802.11ax standard (which is newer and superior to IEEE 802.11ac), the STA, in its Association Request frame, will only announce that it supports IEEE 802.11ac. As such, the Association Request frame fails to provide an AP with the full and accurate capabilities of a STA. However, it is worthwhile to note that a STA announces its full capabilities in a Probe Request frame.

A STA may send a Probe Request frame in broadcast mode or in directed (unicast) mode. In broadcast mode, any wireless device in the transmit range of the STA may receive and decode the contents of the Probe Request frame. In directed (unicast) mode, only the designated receiver of the probe request frame may receive and decode the probe request message.

An AP may force a STA to send a Probe Request frame. The AP can issue an IEEE 802.11k beacon report measurement (BRM) request frame to a STA indicating that active measurement is requested, and thereby, force the STA to send a Probe Request frame.

An AP may utilize Probe Request frames sent by a STA to detect the STA's true wireless capabilities. The AP may utilize broadcast and/or unicast Probe Request frames transmitted by the STA. These broadcast and/or unicast Probe Request frames may be randomly heard by the AP or may be solicited by the AP, as described above. The AP may keep a database of STAs in the network including the MAC address of each STA. In one embodiment, the STA MAC address stored in the database may be the unique Wi-Fi MAC address. The database may also include the true capability of the STA. The database may include a field indicating whether the database has been recently updated with the full capabilities of a given STA. In some embodiments, the AP may periodically review the database to determine which STAs that are associated with the AP have not reported their full capabilities to the AP. The AP may then solicit a Probe Request frame from the STAs that have not yet reported their full capabilities by using the BRM request frame, as described above. Then AP may then update the database with the full capabilities of the STA based on the information provided to the AP in the Probe Request frame. The AP may then mark the database accordingly for the given STA, indicating that the database contains the full capability of the STA. It is noted that the database may also reside in the cloud, and the AP can communicate with the database in the cloud to store the full capabilities of the STA. Messaging between the cloud database and the AP may be utilized to instruct the AP to obtain the needed full capabilities of given STAs for updating the database.

For privacy protection, a STA may disguise its unique Wi-Fi MAC address in a transmitted Probe Request frame.

As such, the STA may use a random MAC address instead of its unique Wi-Fi interface MAC address in the source MAC address field of the transmitted Probe Request frame. Alternatively, instead of a random MAC address, the STA may use a non-static MAC address or a temporary MAC address. When a STA uses a random or non-static MAC address to disguise its true identity, a mechanism is needed to match the STA that is currently connected to an AP with a received Probe Request frame.

In one embodiment, if an AP detects that the MAC address of an associated STA is a locally administered one (i.e., if bit 1 of the EUI-48 MAC address has been set to "1"), implying that the STA uses a random or non-static MAC address in the Probe Request frame, the AP may force the STA to send a Probe Request frame by issuing an 802.11k BRM request message in active mode. The Probe Request frame sent by the STA at this time can be identified as originating from the target STA by the receiving AP without using the STA's MAC address provided in the Probe Request frame. An AP may implement various techniques to identify if the originator of a Probe Request frame is the target STA, such as, but not limited to, by making use of the SSID in the Probe Request frame, the type of Probe Request frame (broadcast or unicast), the arrival timing of the Probe Request frame, and even the capabilities announced in the Probe Request frame as they must at least partially reflect the already known capability information of the STA for which capability discovery is triggered.

In one embodiment, the AP may keep and store one or a plurality of frame bodies of the captured Probe Request frames received from each STA. In an embodiment, the AP may store only the latest captured frame body with respect to a STA. In another embodiment, the AP may process the captured Probe Request frames and store the capability information of each STA contained therein.

Referring to FIG. 1, a method 100 is shown where an AP processes received Probe Request frames to identify the capabilities of a STA. In step 110, the AP checks to determine whether a Probe Request frame has been received, or recently received within a predetermined time period, from a STA. If a Probe Request frame has not been received, an IEEE 802.11k beacon report measurement request frame is transmitted from the AP to the STA, step 120. As described above, the AP or the cloud may use a stored database of STA capabilities to determine whether a Probe Request frame has or has not been recently received. When a Probe Request frame is received, the contents (frame body) of the Probe Request frame is processed and potentially stored, step 130. The capabilities of the STA can then be analysed by the AP, step 140. The analysis and/or the processed frame body of the STA may then be sent to a controller, which may be a local controller, or it may be located elsewhere, for example, in the cloud, step 150. The local analysis performed in step 140 may be optional.

Figure 2:
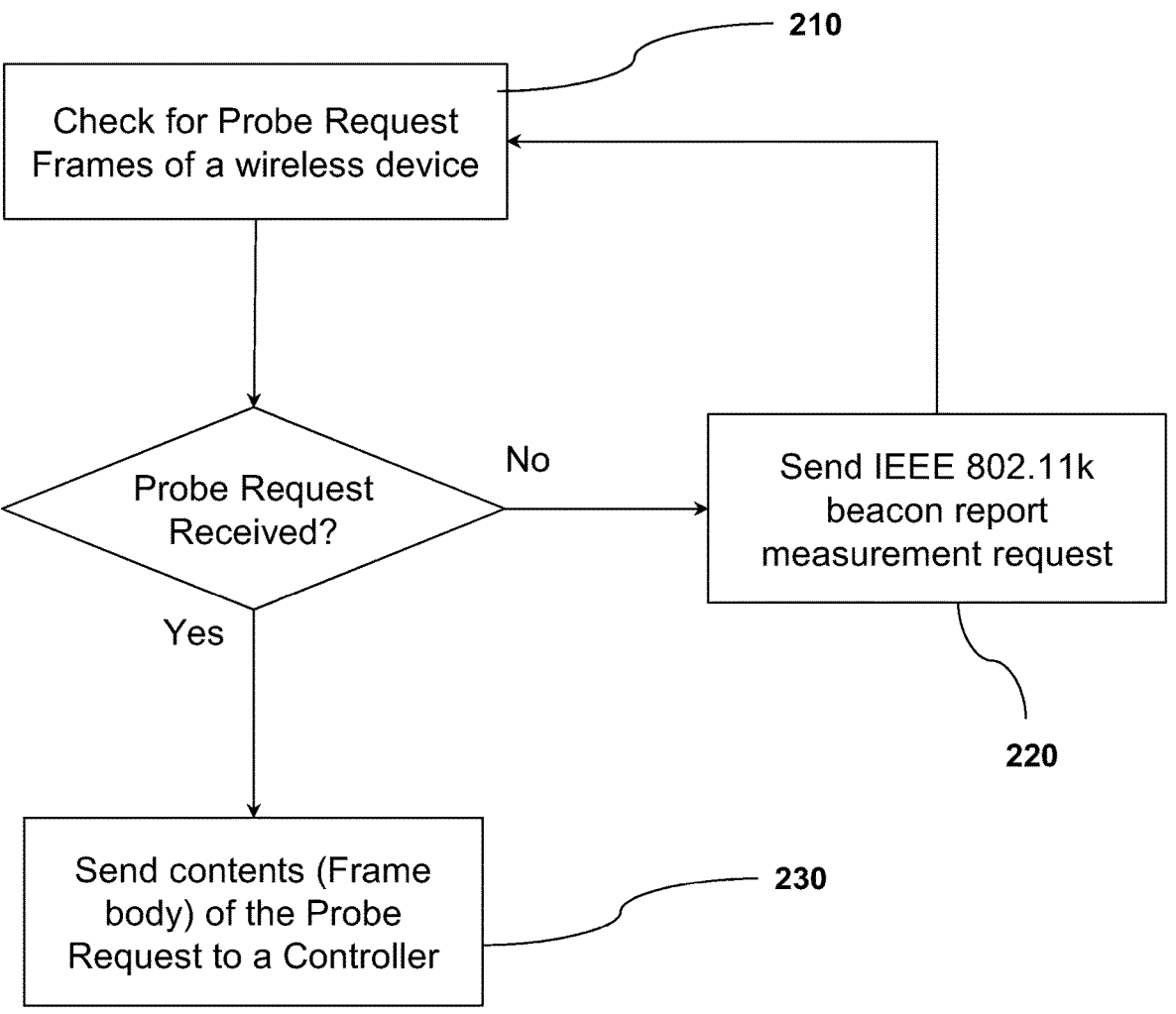
FIG. 2 is a method flow diagram according to another embodiment where a STA reports capabilities to an AP in a Probe Request frame.

In another embodiment, with reference to FIG. 2, a flow diagram of a method 200 where the contents of the Probe Request frames received from the STA are not processed is shown. The method 200 begins with AP checking to determine whether a Probe Request frame has been received, or recently received within a predetermined time period, from a STA, step 210. If a Probe Request frame has not been received, an IEEE 802.11k beacon report measurement request frame is transmitted from the AP to the STA, step 220. As described above, the AP or the cloud may use a stored database of STA capabilities to determine whether a Probe Request frame has or has not been recently received. When a Probe Request frame is received, the contents are not processed and the contents are sent to a controller, which may be a local controller, or it may be located elsewhere, in another network device, or in the cloud. In one embodiment, the controller resides in the LAN, such as in a Wi-Fi Alliance EasyMesh controller. In another embodiment, the controller resides in the cloud or resides in an Edge network.

The controller may process the received frame body of a Probe Request message to identify and determine the capabilities of the STA. In another embodiment, the controller may utilize the received capability information, which is processed by the AP, to identify and determine the capabilities of the STA.

By analysing the capability information of all (or a substantial number of) STAs and APs in the network, a controller may determine if an AP or a plurality of APs have inferior or non-matching capabilities to that of the STAs in the network. In another embodiment, by analysing the capability information of all (or a substantial number of) STAs and APs in the network, a controller may determine if a STA or a plurality of STAs have inferior or non-matching capabilities to that of the APs in the network. As such, in one embodiment, the controller may provide information to be used by BITs. For example, the controller may determine a home network with an AP or plurality of APs equipped with IEEE 802.11ac standard, whereas one or a plurality of STAs in the network are equipped with the IEEE 802.11ax standard, which is superior. BITs may use this information to inform the user about the cause of a possible capacity utilization problem and may recommend the user to upgrade his/her APs.

In one embodiment, an AP may have mesh networking capabilities, and may be a part of a mesh network. The AP may have hybrid-mesh networking capabilities, i.e., the AP may support mesh links that include different combinations of Ethernet, 5 GHz wireless (e.g., 5 GHZ and 2.4 GHz bands of Wi-Fi), Power Line Communication (PLC), and MoCA (Multiplexing over Coax Alliance).

In one embodiment, the local network controller may be a Wi-Fi Alliance EasyMesh controller. In the context of the Wi-Fi Alliance EasyMesh standard, an EasyMesh controller may receive capability information regarding a STA from an EasyMesh agent (which runs in an AP) in the form of an IEEE 802.11 association frame body.

In one embodiment, Wi-Fi EasyMesh agents may be configured to capture Probe Request frames. An EasyMesh agent may provide an EasyMesh controller with capability information regarding a STA in the form of an IEEE 802.11 Probe Request frame body.

An EasyMesh controller that utilizes the disclosed methods may request an EasyMesh agent to issue an IEEE 802.11k BRM request message to a STA indicating active measurement is requested. Note that STAs that receive an IEEE 802.11k BRM request message with active measurement request are required to send a Probe Request message according to the IEEE standard. An EasyMesh agent that receives a Probe Request frame from a STA may capture and store the frame body of the Probe Request frame with the MAC address information of the STA sending the message. When the EasyMesh controller requests capability information of the STA from the EasyMesh agent, the agent may provide the Probe Request frame body to the EasyMesh controller. The Probe Request frame body may be included as a payload in a periodically sent message from the EasyMesh agent to the EasyMesh controller that includes various other information regarding the STA, such as, but not limited to, measured transmit and receive PHY rates, received signal strength information (RSSI).

Figure 3:
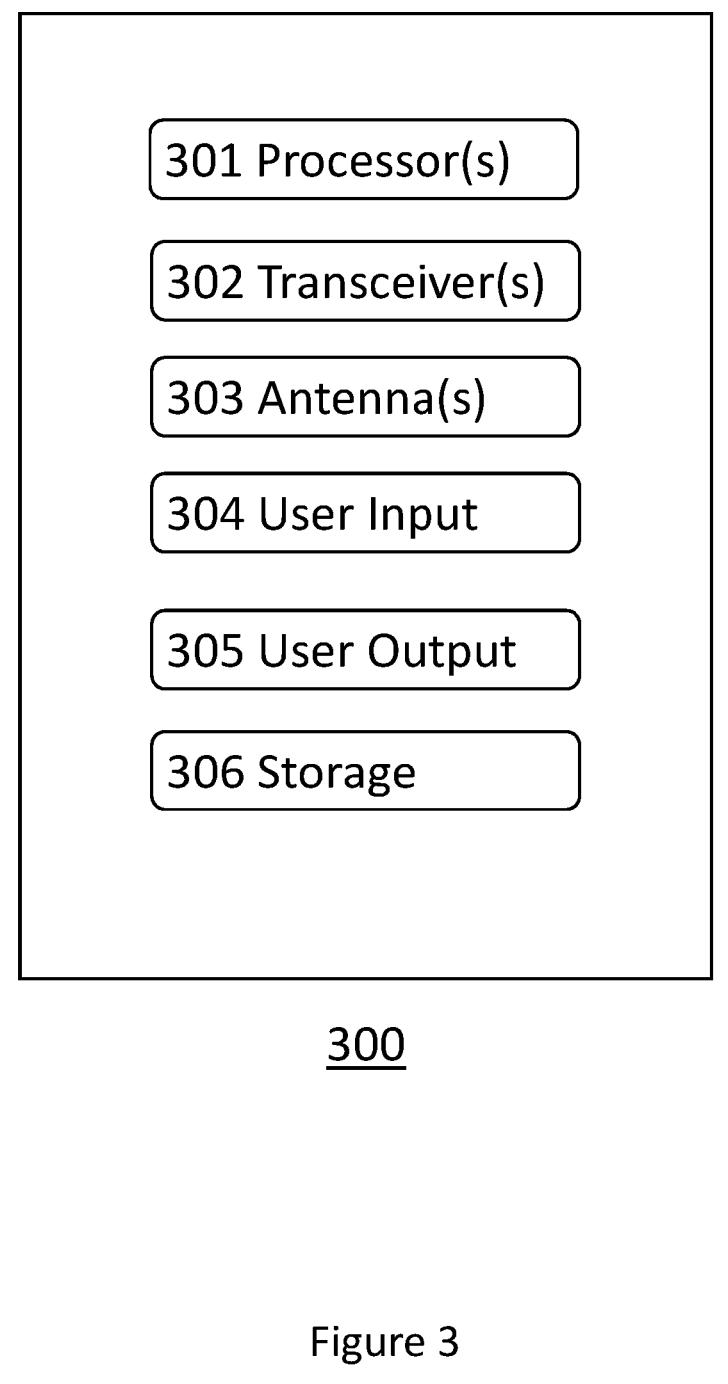

In an example communication system, there may be one or more wireless communication devices (e.g., 300 Communication Device of FIG. 3), such as stations (STAs) (e.g., a client) or access points (APs), that utilize one or more wireless ("Wi-Fi") chips to access the Internet through a Wireless Local Area Network (WLAN). FIG. 3 shows an example of a communication device (e.g., 300). The communication device may include at least one processor (e.g., 301), which may include a baseband processor, a transmit/ receive circuitry (e.g., transceiver 302, receiver, transmitter, etc.), various hardware for user input/output (e.g., 304/305; a speaker/microphone, camera, a display/touchpad/keypad, etc.), a storage 306 that may include non-removable memory and removable memory, a power source, a global positioning system (GPS) chipset, and/or other peripherals, among others. It should be noted that the STA and the AP described herein may include any sub-combination of the disclosed elements while remaining consistent with the description. The hardware components shown in FIG. 3 are configured to perform the methods and procedures described herein.

The processor may be a general-purpose processor, a special-purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor may perform signal coding, data processing, power control, input/output processing, and/or any other functionality that enables the communication device 300 to operate in a wireless environment. The processor may be coupled to the transceiver, which may be coupled to the transmit/receive element. The processor and the transceiver may be separate components, or the processor and the transceiver may be integrated together in an electronic package or chip.

The transmit/receive element (e.g., transceiver) may be configured to transmit signals to, or receive signals from, other communication devices over an air interface. In an example, the transmit/receive element may be one or more antennas configured to transmit and/or receive radio frequency (RF) signals.

The transmit/receive element may be a single physical element, or multiple physical elements. More specifically, a communication device may employ multiple-input multiple-output (MIMO) technology. In an example, a communication device may include two or more transmit/receive elements (e.g., multiple antennas) for transmitting and receiving wireless signals over an air interface.

A processor may be configured to modulate the signals that are to be transmitted by the transmit/receive element and to demodulate the signals that are received by the transmit/receive element. The communication device may have multi-mode capabilities. Thus, the communications device may include multiple transmit/receive elements and/ or multiple processors to communicate via multiple air interfaces.

The processor of the communication device may be coupled to, and may receive user input data from, the speaker/microphone, the keypad, and/or the display/touchpad (e.g., a liquid crystal display (LCD) display unit or organic light-emitting diode (OLED) display unit). The processor may also output user data to the speaker/microphone, the keypad, and/or the display/touchpad. In addition, the processor may access information from, and store data in, any type of suitable memory, such as the non-removable memory and/or the removable memory. The non-removable memory may include random-access memory (RAM), read-only memory (ROM), a hard disk, or any other type of memory storage device. The removable memory may include a subscriber identity module (SIM) card, a memory stick, a secure digital (SD) memory card, and the like. In some cases, the processor may access information from, and store data in, memory that is not physically located on the communication device, such as on a server or a home computer.

The processor may receive power from the power source and may be configured to distribute and/or control the power to the other components in the communication device. The power source may be any suitable device for powering the communication device. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor may further be coupled to other peripherals, which may include one or more software and/or hardware modules that provide additional features, functionality and/or wired or wireless connectivity. For example, the peripherals may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The communication device may include a full duplex radio for which transmission and reception of some or all of the signals (e.g., associated with particular subframes for both the uplink (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor. In an embodiment, the communication device may include a half-duplex radio for which transmission and reception of some or all of the signals (e.g., associated with particular subframes) for either the uplink (e.g., for transmission) or the downlink (e.g., for reception).

What is claimed is:

1. An access point (AP) comprising:
a receiver configured to receive, from a station (STA), an association request frame including a subset of STA capabilities;
a processor, coupled to the receiver and a transmitter, configured to associate with the STA based on the association request frame;
the processor configured to determine that a full set of STA capabilities of the STA is desired;
the transmitter configured to transmit, in response to a determination that a full set of STA capabilities is desired, a beacon report measurement request frame to the STA;

the receiver configured to receive, from the STA in response to the beacon report measurement request frame, a probe request frame including a full set of STA capabilities; and
the processor configured to update a database of station capabilities with the full set of STA capabilities based on the received probe request frame.

2. The AP of claim 1, wherein the database is located in the AP.

3. The AP of claim 1, wherein the database is located in a cloud server.

4. The AP of claim 1, wherein the database is located in a Wi-Fi Alliance EasyMesh™ controller.

5. The AP of 1, wherein the processor is further configured to perform analysis on the full set of STA capabilities.

6. The AP of claim 5, wherein the analysis includes determining whether an equipment upgrade is warranted.

7. The AP of claim 1, wherein the transmitter is further configured to periodically transmit a plurality of beacon report measurement request frames to the STA.

8. The AP of claim 1, wherein the transmitter is further configured to transmit a second beacon report measurement request frame to the STA when the processor determines that a previously received full set of STA capabilities has become stale.

9. The AP of claim 1, wherein the processor is further configured to receive, from a cloud server, an instruction to obtain a full set of STA capabilities.

10. The AP of claim 9, wherein the transmitter is configured to transmit a beacon report measurement request frame to the STA in response to receiving the instruction to obtain a full set of STA capabilities from the cloud server.

11. A method for use in an access point (AP), the method comprising:
receiving, from a station (STA), an association request frame including a subset of STA capabilities;
associating with the STA based on the association request frame;
determining that a full set of STA capabilities of the STA is desired;
transmitting, in response to a determination that a full set of STA capabilities is desired, a beacon report measurement request frame to the STA;
receiving, from the STA in response to the beacon report measurement request frame, a probe request frame including a full set of STA capabilities; and
updating a database of station capabilities with the full set of STA capabilities based on the received probe request frame.

12. The method of claim 11, wherein the database is located in the AP.

13. The method of claim 11, wherein the database is located in a cloud server.

14. The method of claim 11, wherein the database is located in a Wi-Fi Alliance EasyMesh™ controller.

15. The method of 11, further comprising:
analysing the full set of STA capabilities.

16. The method of claim 15, wherein the analysing includes determining whether an equipment upgrade is warranted.

17. The method of claim 11, further comprising:
periodically transmitting a plurality of beacon report measurement request frames to the STA.

18. The method of claim 11, further comprising:
transmitting a second beacon report measurement request frame to the STA when the processor determines that a previously received full set of STA capabilities has become stale.

19. The method of claim 11, further comprising:
receiving, from a cloud server, an instruction to obtain a full set of STA capabilities.

20. The method of claim 19, further comprising:
transmitting a beacon report measurement request frame to the STA in response to receiving the instruction to obtain a full set of STA capabilities from the cloud server.

\* \* \* \* \*